US012769254B2

(12) United States Patent
Aoki

(10) Patent No.: US 12,769,254 B2
(45) Date of Patent: Oct. 20, 2026

(54) TIMEPIECE COMPRISING OVERLAPPING ANTI-MAGNETIC SHIELDS

(71) Applicant: SEIKO EPSON CORPORATION, Tokyo (JP)

(72) Inventor: Shunsei Aoki, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 316 days.

(21) Appl. No.: 18/361,111

(22) Filed: Jul. 28, 2023

(65) Prior Publication Data

US 2024/0036521 A1 Feb. 1, 2024

(30) Foreign Application Priority Data

Jul. 29, 2022 (JP) ................................ 2022-121346

(51) Int. Cl.
*G04B 43/00* (2006.01)

(52) U.S. Cl.
CPC .................................... *G04B 43/00* (2013.01)

(58) Field of Classification Search
None
See application file for complete search history.

(56) References Cited

U.S. PATENT DOCUMENTS 3,919,836 A * 11/1975 Nishizawa ............. G04B 43/00 368/293
2004/0105347 A1 6/2004 Fujimori et al.
2007/0086276 A1* 4/2007 Furukawa ................. G04F 8/08 368/80
2014/0086026 A1* 3/2014 Mitani .................. G04R 60/08 368/278
2018/0246476 A1* 8/2018 Yokoo .................... G04C 3/146
2019/0018367 A1* 1/2019 Rachdi ..................... G04B 5/16
2020/0301370 A1* 9/2020 Sakata ................... G04G 17/02

FOREIGN PATENT DOCUMENTS

| | | | | |
|---|---|---|---|---|
| CN | 1514958 | A | | 7/2004 |
| DE | 2710828 | A | * | 9/1977 |
| JP | 2001-108764 | A | | 4/2001 |
| JP | 2003-043166 | A | | 2/2003 |
| JP | 2011-077824 | A | | 4/2011 |
| JP | 2018-141639 | A | | 9/2018 |

* cited by examiner

*Primary Examiner* — Edwin A. Leon
*Assistant Examiner* — Matthew Daniel Hwang
(74) *Attorney, Agent, or Firm* — Harness, Dickey & Pierce, P.L.C.

(57) ABSTRACT

A timepiece includes a case having a cylindrical shape, a case back including a transmissive region and covering one opening of the case, and a movement accommodated in the case, the movement including a timepiece component, a first magnetic shield component covering at least a portion on the case back side of the timepiece component, and a second magnetic shield component covering at least a portion of a side surface of the timepiece component. The first magnetic shield component includes an overlapping region overlapping the second magnetic shield component in plan view as viewed from a direction perpendicular to the case back, and the first magnetic shield component and the second magnetic shield component are disposed in contact with each other in the overlapping region.

13 Claims, 12 Drawing Sheets

TIMEPIECE COMPRISING OVERLAPPING ANTI-MAGNETIC SHIELDS

The present application is based on, and claims priority from JP Application Serial Number 2022-121346, filed Jul. 29, 2022, the disclosure of which is hereby incorporated by reference herein in its entirety.

BACKGROUND

1. Technical Field

The present disclosure relates to a timepiece.

2. Related Art

JP-A-2018-141639 discloses a timepiece having a configuration in which a magnetic shield plate capable of shielding against a magnetic field from the outside covers all or a portion of a plurality of motors. The magnetic shield plate is integrally formed into a single plate member by punching a plate serving as the material thereof into a predetermined shape and subsequently executing processing such as bending. As a result, upper sides and side surfaces of the motors can be covered with the magnetic shield plate having a seamless wide area.

In the technique described in JP-A-2018-141639, because the magnetic shield plate is formed by bending a single plate member, wrinkles or cracks may occur in processed portions. On the other hand, there is known a timepiece having a see-through structure in which a case back is constituted by a transparent member such as glass, and a movement in the interior is visible to a user to improve the appearance. When the technique described in JP-A-2018-141639 is applied to a timepiece having a see-through structure, there is a possibility that the magnetic shield plate is visible from the outside, resulting in the problem that such wrinkles and cracks are noticeable, in other words, the appearance quality deteriorates.

SUMMARY

A timepiece includes a case having a cylindrical shape, a case back including a transmissive region and covering one opening of the case, and a movement accommodated in the case, the movement including a timepiece component, a first magnetic shield component covering at least a portion on the case back side of the timepiece component, and a second magnetic shield component covering at least a portion of a side surface of the timepiece component. The first magnetic shield component includes an overlapping region overlapping the second magnetic shield component in plan view as viewed from a direction perpendicular to the case back, and the first magnetic shield component and the second magnetic shield component are disposed in contact with each other in the overlapping region.

DESCRIPTION OF EXEMPLARY EMBODIMENTS

The following description is given with reference to the drawings including an X axis, a Y axis, and a Z axis that are three axes orthogonal to each other. A direction along the X axis is referred to as “X direction”, a direction along the Y axis is referred to as “Y direction”, and a direction along the Z axis is referred to as “Z direction”. A direction indicated by an arrow is a + direction, and a direction opposite to the + direction is a − direction. Note that a +Z direction may be also referred to as “up” or an “upper side”, and a −Z direction may be also referred to as “down” or a “lower side”. Furthermore, the view in the +Z direction and the −Z direction is referred to as plan view or plane view. Furthermore, the description is given assuming that a surface on the + side in the Z direction is an upper surface, and a surface on the opposite side, that is, on the − side in the Z direction is a lower side.

First, a configuration of a timepiece 1 will be described with reference to FIGS. 1 and 2.

Figure 1:
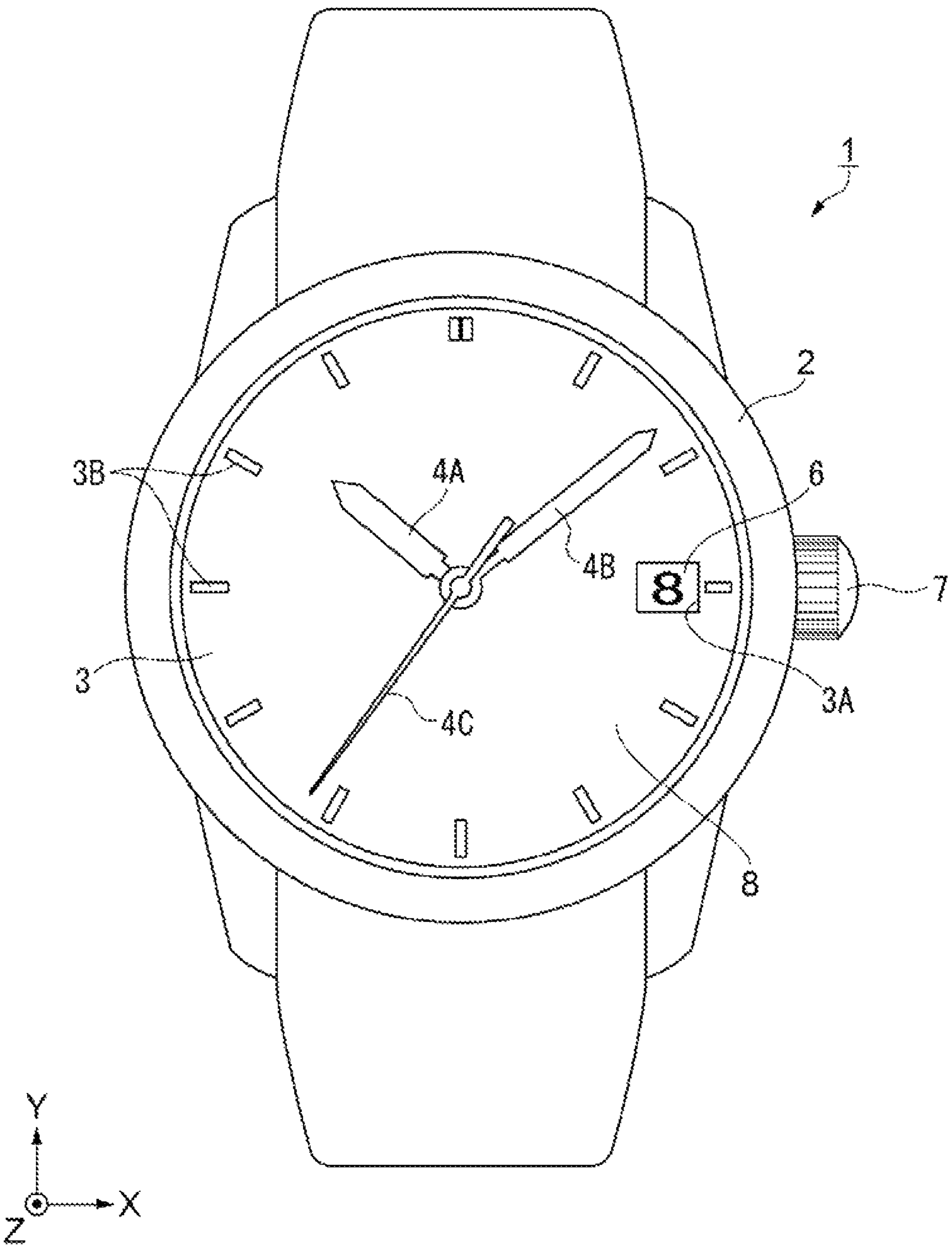
FIG. 1 is a plan view illustrating a configuration of a dial side of a timepiece.

As illustrated in FIG. 1, the timepiece 1 is a wristwatch worn on a wrist of a user and includes a case 2 having a cylindrical shape. A dial 3 is disposed on an inner circumferential side of the case 2. Among two openings of the case 2, an opening on a front surface side is covered by a cover glass 8, and an opening on a back surface side is covered by a case back 9. Note that the case 2 and the case back 9 need not be separate bodies, and the case may be of an integrally formed one-piece type.

Figure 2:
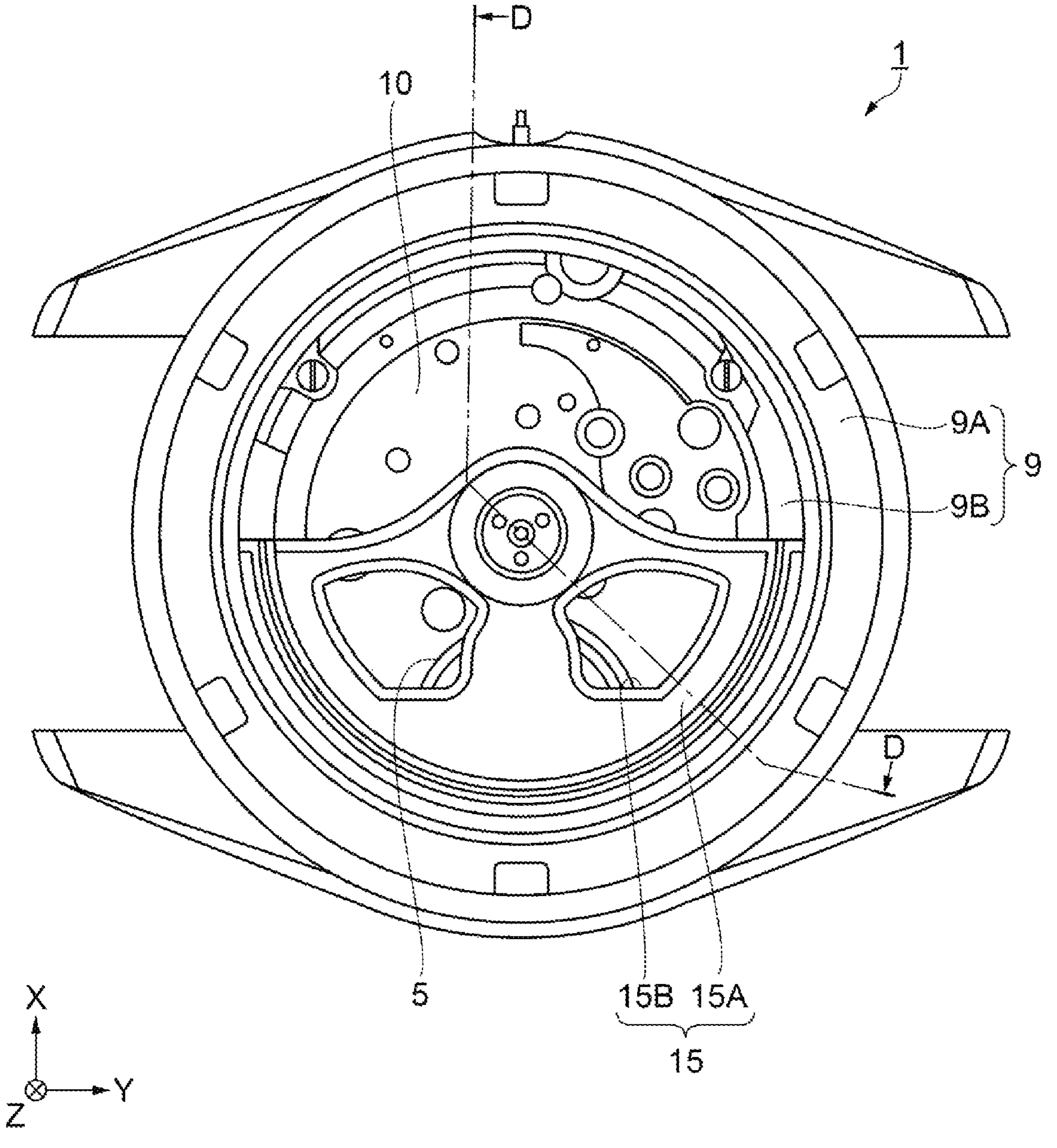
FIG. 2 is a plan view illustrating a configuration of a case back side of the timepiece.

As illustrated in FIG. 2, the case back 9 is constituted by a frame 9A having a ring shape and a case back glass 9B attached to the frame 9A. The case back glass 9B functions as a transmissive region. The timepiece 1 of this exemplary embodiment is a skeleton-type timepiece including the transmissive region in which an oscillating weight 15 and a power reserve hand are visible from the case back 9 side of the timepiece 1.

The timepiece 1 includes a movement 10 (refer to FIG. 2) accommodated in the case 2, an hour hand 4A, a minute hand 4B, and a seconds hand 4C that display time information, and a power reserve hand that indicates the duration of a mainspring. The dial 3 is provided with a small calendar window 3A, and a date indicator 6 is visible through the small calendar window 3A. Further, the dial 3 is provided with hour marks 3B for indicating the hour. A power reserve scale 5 having a fan shape is provided on the case back side of a train wheel bridge 25 described below. The power reserve hand points to this power reserve scale 5, making it possible to display the amount of winding left on the mainspring. Although not illustrated, the power reserve hand is attached so as to rotate about a center of the fan of the power reserve scale 5.

A crown 7 attached to a winding stem 12 (refer to FIG. 3) is provided on a side surface of the case 2. The crown 7 can be pulled out and moved from a zero position of being pushed in toward a center of the timepiece 1 to a first-step position and a second-step position. When the crown 7 is rotated in the zero position, the mainspring as a mechanical energy source provided in the movement 10 is wound. The power reserve hand moves in conjunction with the winding of the mainspring.

When the crown 7 is pulled to the first-step position and rotated, the date indicator 6 can be moved to set the date. When the crown 7 is pulled to the second-step position, the seconds hand 4C stops, and when the crown 7 is rotated in the second-step position, the hour hand 4A and the minute hand 4B can be moved to set the time.

As illustrated in FIG. 2, an opening 15B is formed in a weight body 15A of the oscillating weight 15, and is configured so that the power reserve hand and the power reserve scale 5 indicating the amount of winding left on the mainspring are less likely to be invisible due to the position of the oscillating weight 15.

Next, a configuration of the movement 10 as viewed from the dial 3 side will be described with reference to FIGS. 3 to Here, the movement 10 refers to a structure assembled as a single unit, excluding exterior components such as the case 2, the dial 3, and the hands 4A to 4C from the timepiece 1, and including driving components for driving the hands 4A to 4C, such as a train wheel. Note that FIG. 4 illustrates a state in which the date indicator 6 is removed from the movement 10 illustrated in FIG. 3. The movement 10 illustrated in FIG. 5 is disposed with the side to which the dial 3 is attached (hereinafter referred to as the dial 3 side) facing downward.

Figure 3:
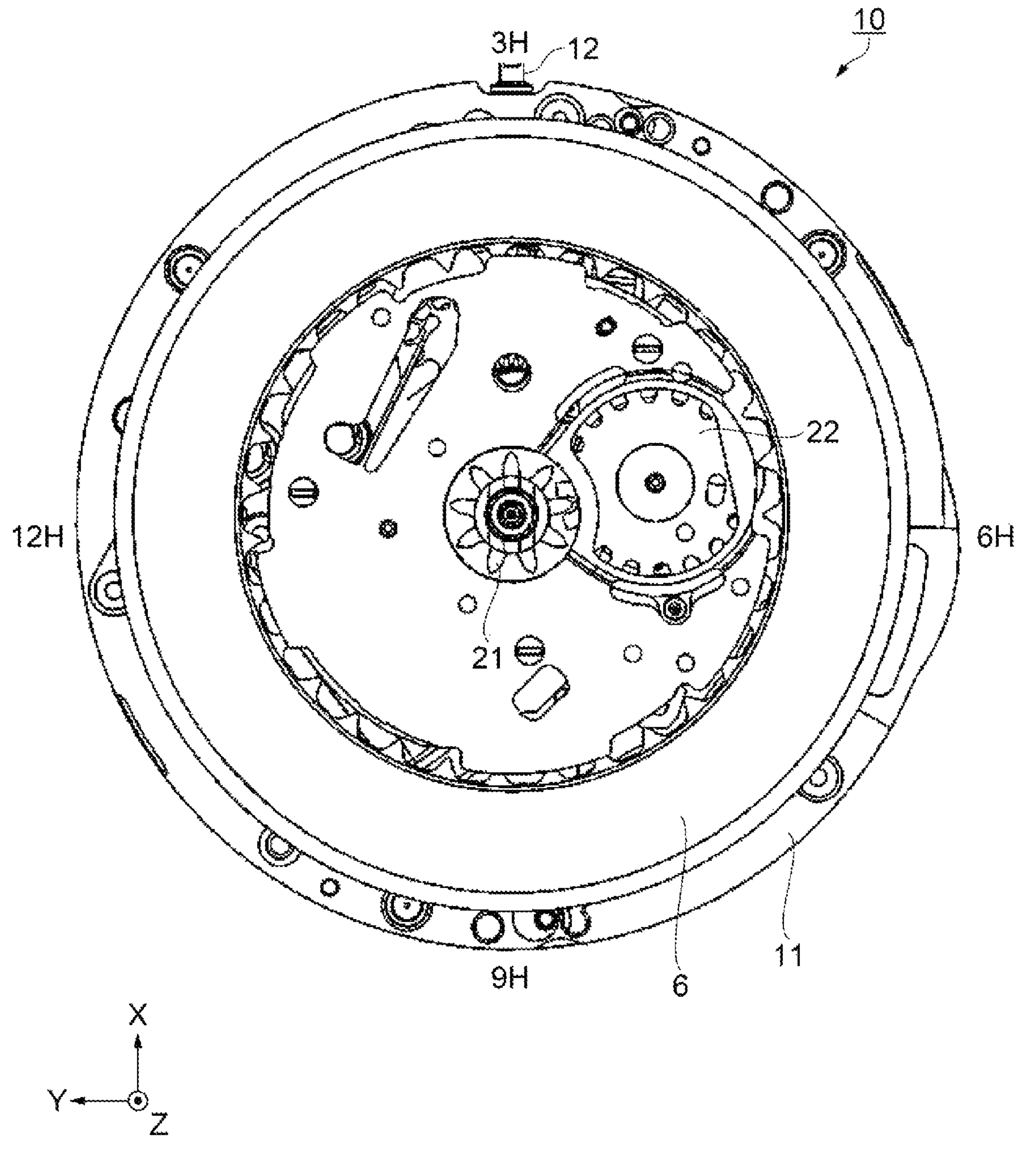
FIG. 3 is a plan view illustrating a dial side of a movement.
Figure 4:
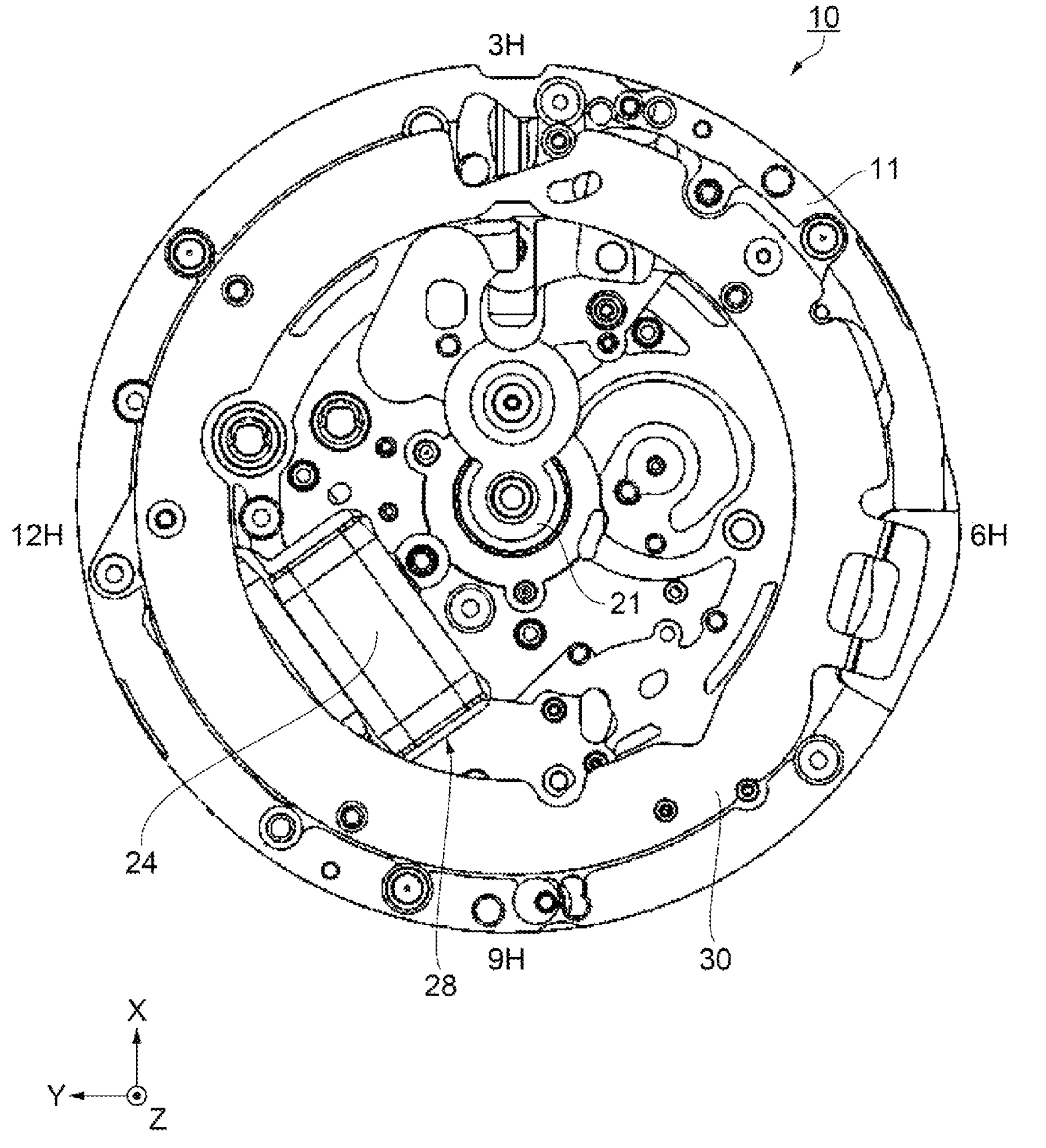
FIG. 4 is a plan view illustrating a state in which a date indicator of the movement is removed.
Figure 5:
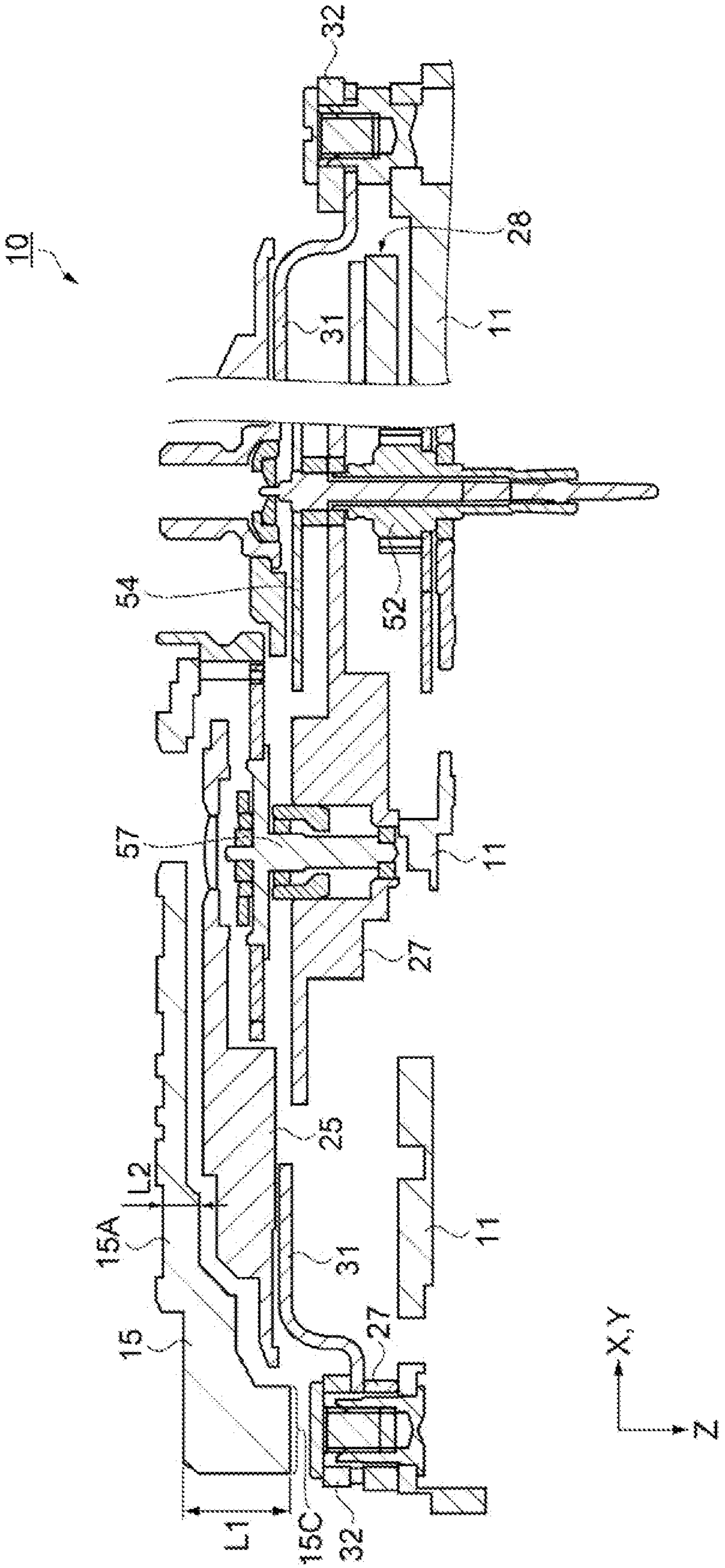
FIG. 5 is a cross-sectional view taken along line D-D of the movement illustrated in FIGS. 2 and 7.

As illustrated in FIGS. 3 and 4, in the movement 10, an hour wheel 21 is disposed at a main plate 11. The hour hand 4A is fixed to the hour wheel 21. A date indicator driving intermediate wheel is attached to the hour wheel 21, and a date indicator driving finger for rotating the date indicator 6 is attached to a date indicator driving wheel 22 rotated by the date indicator driving intermediate wheel.

As illustrated in FIG. 4, when the date indicator 6 is removed from the movement 10, a dial-side magnetic shield component 30 having an annular shape is disposed overlapping the date indicator 6. The dial-side magnetic shield component 30 is used for shielding against a magnetic field from the outside of the timepiece 1. Note that a coil block 24 as a timepiece component is disposed under or on an inner side of the dial-side magnetic shield component 30 formed in an annular shape. This makes it possible to suppress the influence of a magnetic field from the dial 3 side on the coil block 24.

The dial-side magnetic shield component 30 is made of, for example, pure iron or permalloy.

Next, a configuration of the movement 10 as viewed from the case back 9 side will be described with reference to FIGS. 5 to 11. Note that FIG. 7 illustrates a state in which the train wheel bridge 25 as a bridge component is removed from the movement 10 illustrated in FIG. 6. As described above, the movement 10 illustrated in FIG. 5 is disposed so that the dial 3 side faces downward, that is, the case back 9 side faces upward.

Figure 6:
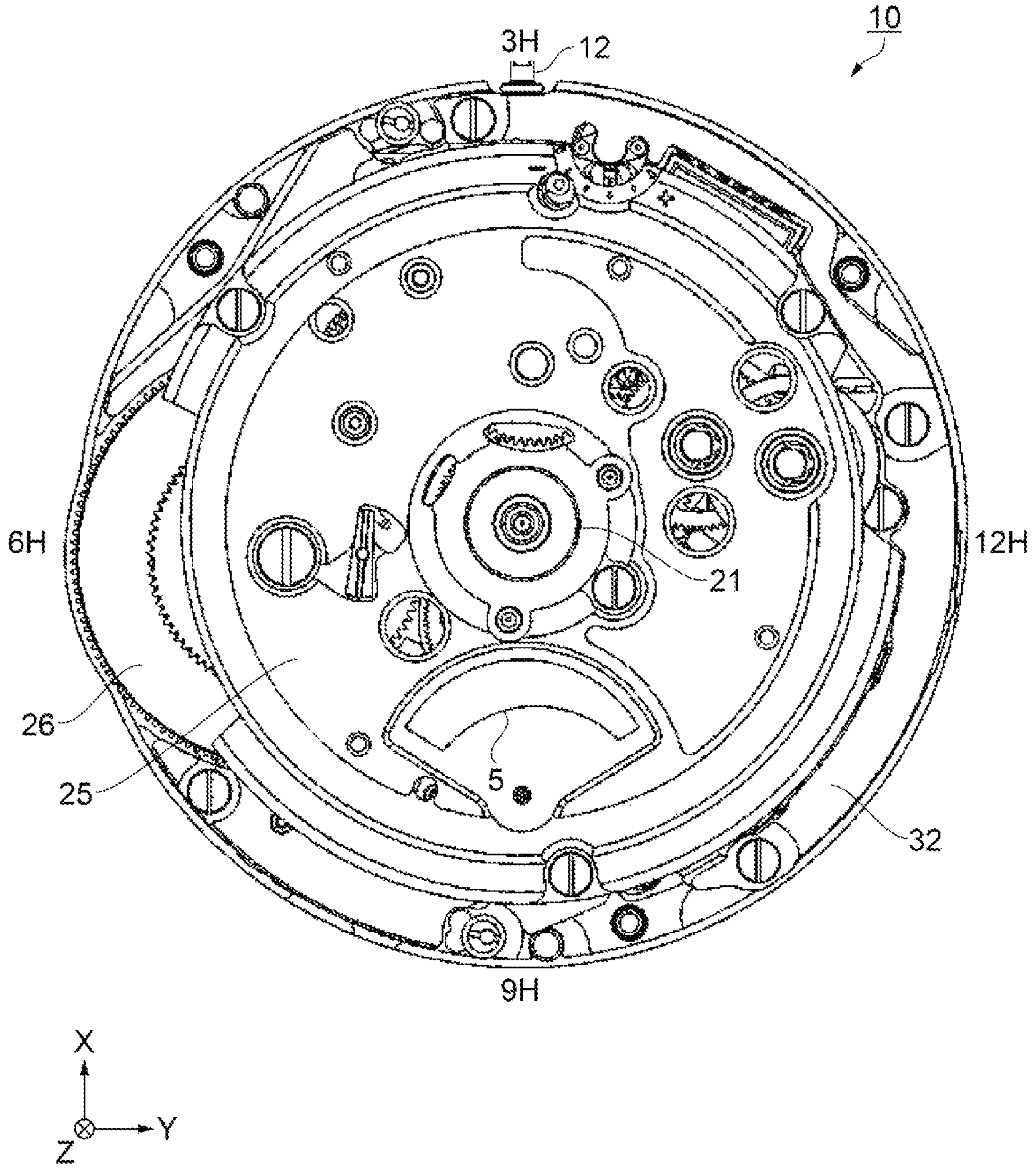
FIG. 6 is a plan view illustrating a case back side of the movement.
Figure 7:
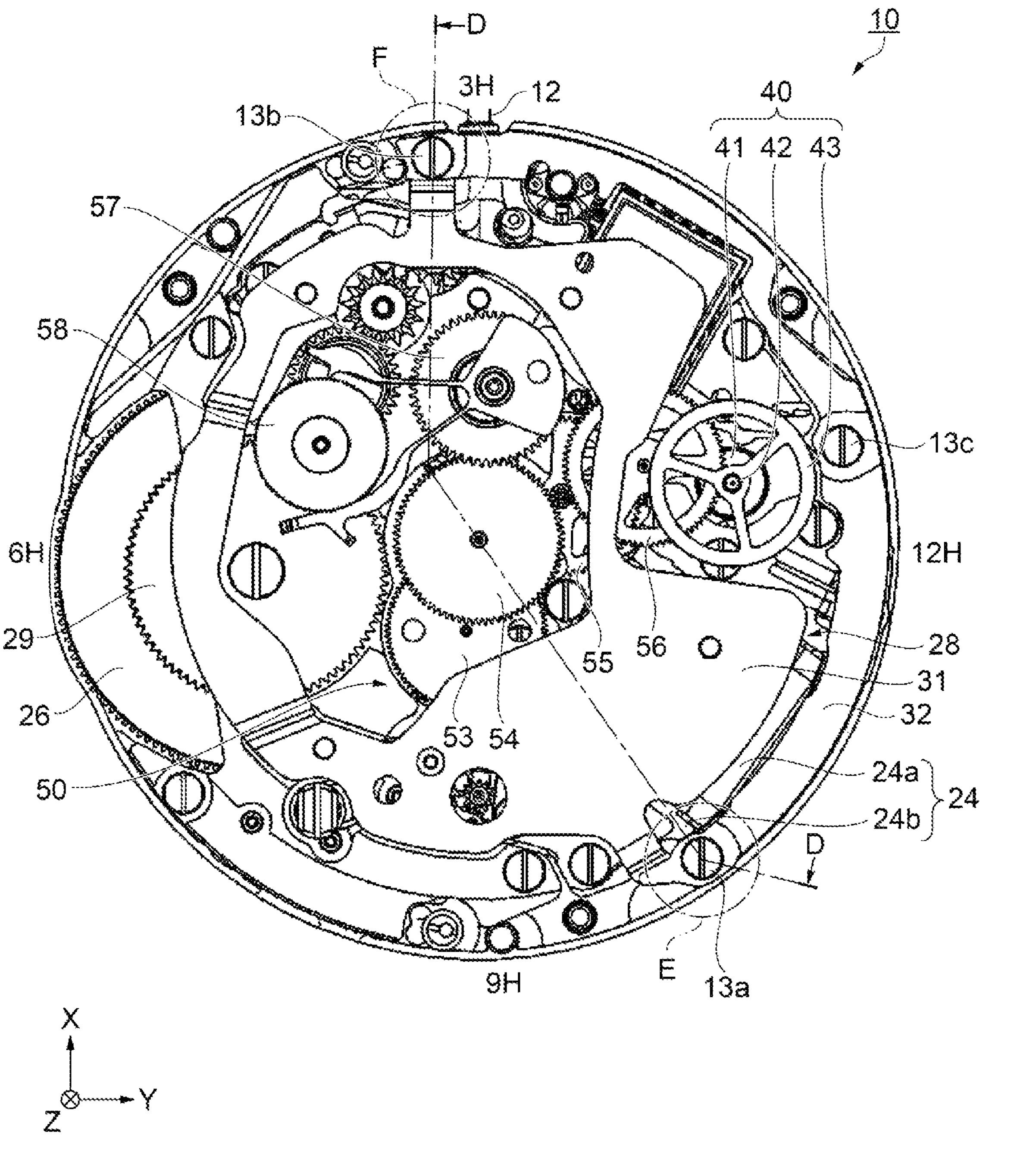
FIG. 7 is a plan view illustrating a state in which a train wheel bridge of the movement is removed.

As illustrated in FIGS. 6 and 7, the movement 10 as viewed from the case back 9 side includes a movement barrel complete 26 in which the mainspring is accommodated. The hour hand 4A, the minute hand 4B, and the seconds hand 4C are attached to the hour wheel 21, a cannon pinion, and a fourth wheel and pinion 54 of the movement 10, respectively, and are driven by the mainspring of the movement 10.

The movement 10 includes the main plate 11, a second bridge 27 (refer to FIG. 5), and the train wheel bridge 25 that holds the train wheel. The main plate 11, the second bridge 27, and the train wheel bridge 25 are flat plate-shaped components including surfaces. As illustrated in FIG. 5, between the main plate 11, the second bridge 27, and the train wheel bridge 25 are disposed a barrel accommodating the mainspring, a power reserve display mechanism, portions of a manual winding mechanism and an automatic winding mechanism for winding the mainspring, a display train wheel 50 for transmitting a torque of the mainspring, a generator 28 (refer to FIG. 5) driven by the torque transmitted via the display train wheel 50, and a printed wired board on which an integrated circuit (IC; not illustrated) driven by electric power from the generator 28 and configured to control a rotation period of the display train wheel 50.

As illustrated in FIG. 7, the generator 28 includes a rotor 40 and the coil block 24. The rotor 40 includes a rotor magnet 41, a rotor pinion 42, and a rotor inertia disk 43. As will be described below, the torque from the mainspring is transmitted to the rotor 40 via the display train wheel 50. The coil block 24 is constituted by a coil 24*a* and a stator 24*b*.

When the rotor 40 rotates by the torque of the mainspring, the generator 28 can generate induced power by the coil block 24, output electrical energy, and supply the electrical energy to the IC or the like. Further, a brake can be applied to the rotor 40 by short-circuiting the coil 24*a*, and the rotation period of the rotor 40, that is, the rotation period of the display train wheel 50, can be adjusted to a constant speed by controlling the braking force by the control by the IC.

As described above, the timepiece 1 according to the exemplary embodiment is configured as an electronically controlled mechanical timepiece that uses the rotation of the rotor 40 of the generator 28 that generates induced power, outputs electrical energy, and is utilized as a speed governor mechanism.

The barrel accommodates the mainspring and includes the movement barrel complete 26 and a barrel stem. A ratchet wheel 29 that rotates integrally with the barrel stem is attached to the barrel stem.

The automatic winding mechanism includes the oscillating weight 15 illustrated in FIG. 5, a bearing (not illustrated) that includes a gear that rotatably supports the oscillating weight 15 and rotates integrally with the oscillating weight

15, an eccentric wheel 57 illustrated in FIG. 7 that meshes with the gear of this bearing, a pawl lever, and the transmission wheel 58. When the oscillating weight 51 rotates, the ratchet wheel 29 coaxially attached to the movement barrel complete 26 rotates via the eccentric wheel 57, the pawl lever, and the transmission wheel 58, thereby winding the mainspring accommodated in the movement barrel complete 26. Note that in this exemplary embodiment, description of the manual winding mechanism is omitted.

Next, the display train wheel 50 for driving the hour hand 4A, the minute hand 4B, and the seconds hand 4C by the mechanical energy from the mainspring will be described. As illustrated in FIG. 7, the display train wheel 50 includes a center wheel and pinion, a third wheel and pinion 53, the fourth wheel and pinion 54, a fifth wheel and pinion 55, and a sixth wheel and pinion 56, and is disposed at the main plate 11. The rotation of the movement barrel complete 26 is transmitted to the center wheel and pinion and, after the third wheel and pinion 53, the fourth wheel and pinion 54, the fifth wheel and pinion 55, and the sixth wheel and pinion 56 are increased in speed sequentially, is transmitted to the rotor 40. The minute hand 4B is fixed to the center wheel and pinion via a cannon pinion. The seconds hand 4C is fixed to the fourth wheel and pinion 54. Further, the hour wheel 21 is coupled to the cannon pinion via the minute wheel. The hour hand 4A is fixed to this hour wheel 21.

Note that the barrel, the eccentric wheel 57, the pawl lever, and the transmission wheel 58 of the automatic winding mechanism, and the display train wheel 50 may be collectively referred to as the train wheel.

As illustrated in FIG. 7, a first magnetic shield component 31 is disposed on an inner side of an outer periphery of the main plate 11. That is, the first magnetic shield component 31 is disposed covering at least a portion on the case back 9 side of the coil block 24.

Further, the first magnetic shield component 31 is formed in an annular shape in plan view as viewed from the case back 9 side. At least a portion of the train wheel is disposed on an inner side of the first magnetic shield component 31 in plan view. Specifically, at least the fourth wheel and pinion 54, the eccentric wheel 57, and the transmission wheel 58 are disposed on the inner side of the first magnetic shield component 31. In other words, the first magnetic shield component 31 having an annular shape is disposed so as to stay clear of a portion of the train wheel at a central portion of the movement 10.

Further, as illustrated in FIG. 5, the first magnetic shield component 31 is disposed between the main plate 11 and the train wheel bridge 25 in a side view as viewed from a direction parallel to a surface of the case back 9. Specifically, the first magnetic shield component 31 has the same height as a portion of the train wheel and is disposed within a range in which the train wheel is disposed in the Z direction perpendicular to a surface of the main plate 11.

Note that "same height" in this exemplary embodiment is not limited to a state in which the heights of some components such as the center wheel and pinion 52, the third wheel and pinion 53, the fourth wheel and pinion 54, the transmission wheel 58, the pawl lever, and the eccentric wheel 57 constituting the train wheel are flush with the height of the first magnetic shield component 31. For example, "same height" also includes, in a side view, a state in which the first magnetic shield component 31 overlaps some of the components, and a state in which the first magnetic shield component 31 is disposed at a position closer to the main plate than the component disposed closest to the case back among the components constituting the wheel train. In this exemplary embodiment, the first magnetic shield component 31 is disposed closer to the main plate than the eccentric wheel 57. That is, the first magnetic shield component 31 is disposed at a height within a range in the Z direction of the components constituting the train wheel in a side view, making it possible to reduce a thickness of the timepiece 1 compared to a case in which the magnetic shield component is disposed closer to the case back 9 than the movement 10 as in the related art.

As illustrated in FIG. 7, in plan view, a second magnetic shield component 32 is disposed on an outer side of the first magnetic shield component 31 and on the inner side of the outer periphery of the main plate 11. Specifically, the second magnetic shield component 32 is disposed covering at least a portion of a side surface of the coil block 24 (refer to FIG. Furthermore, the second magnetic shield component 32 is in contact with a portion of the first magnetic shield component 31 (refer to FIG. 10).

Note that the first magnetic shield component 31 and the second magnetic shield component 32 are made of, for example, pure iron or permalloy, similar to the dial-side magnetic shield component 30.

Figure 8A:
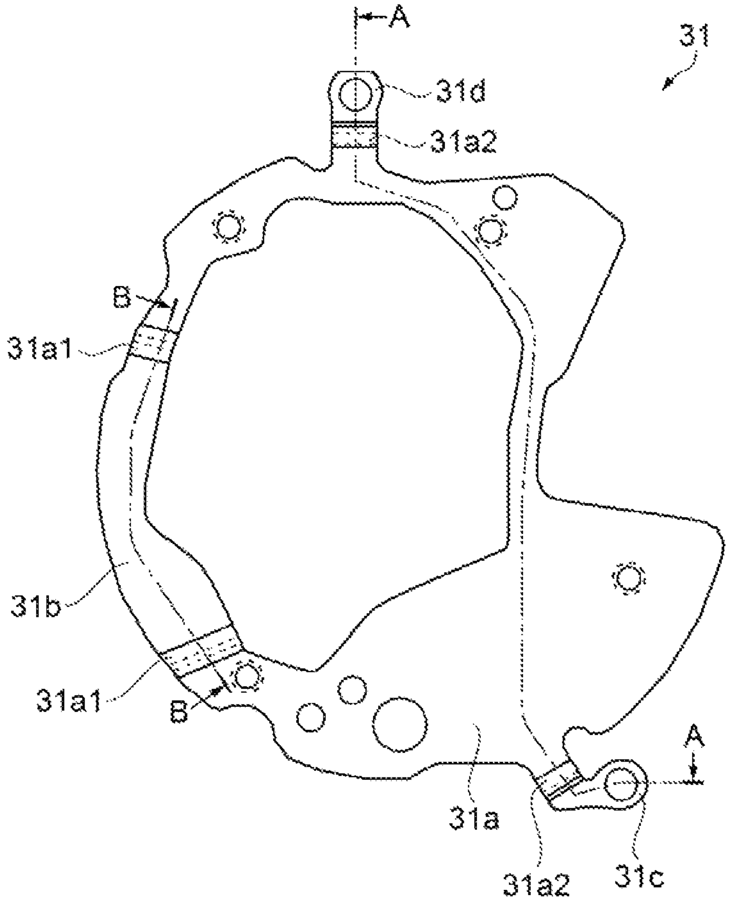
FIG. 8A is a plan view illustrating a configuration of a first magnetic shield component.
Figure 8B:
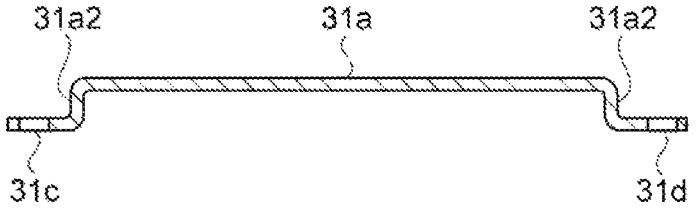
FIG. 8B is a cross-sectional view of the first magnetic shield component taken along line A-A illustrated in FIG. 8A.
Figure 8C:
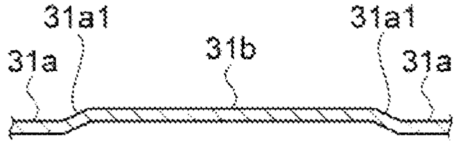
FIG. 8C is a cross-sectional view of the first magnetic shield component taken along line B-B illustrated in FIG. 8A.

As illustrated in FIGS. 8A, 8B, and 8C, the first magnetic shield component 31 having an annular shape includes a first main body portion 31*a*, a second main body portion 31*b*, a first contact portion 31*c*, and a second contact portion 31*d*. Specifically, the first magnetic shield component 31 includes a side portion 31*a*2 extending from the first main body portion 31*a* to the side surface of the coil block 24, and the first contact portion 31*c* and the second contact portion 31*d* as an overlapping portion provided continuously to the side portion 31*a*2 and forming an overlapping region.

The second main body portion 31*b* is provided at a position higher than that of the first main body portion 31*a* with a step portion 31*a*1 interposed therebetween. The first contact portion 31*c* and the second contact portion 31*d* are provided at positions lower than that of the first main body portion 31*a* with the side portion 31*a*2 interposed therebetween.

Figure 9A:
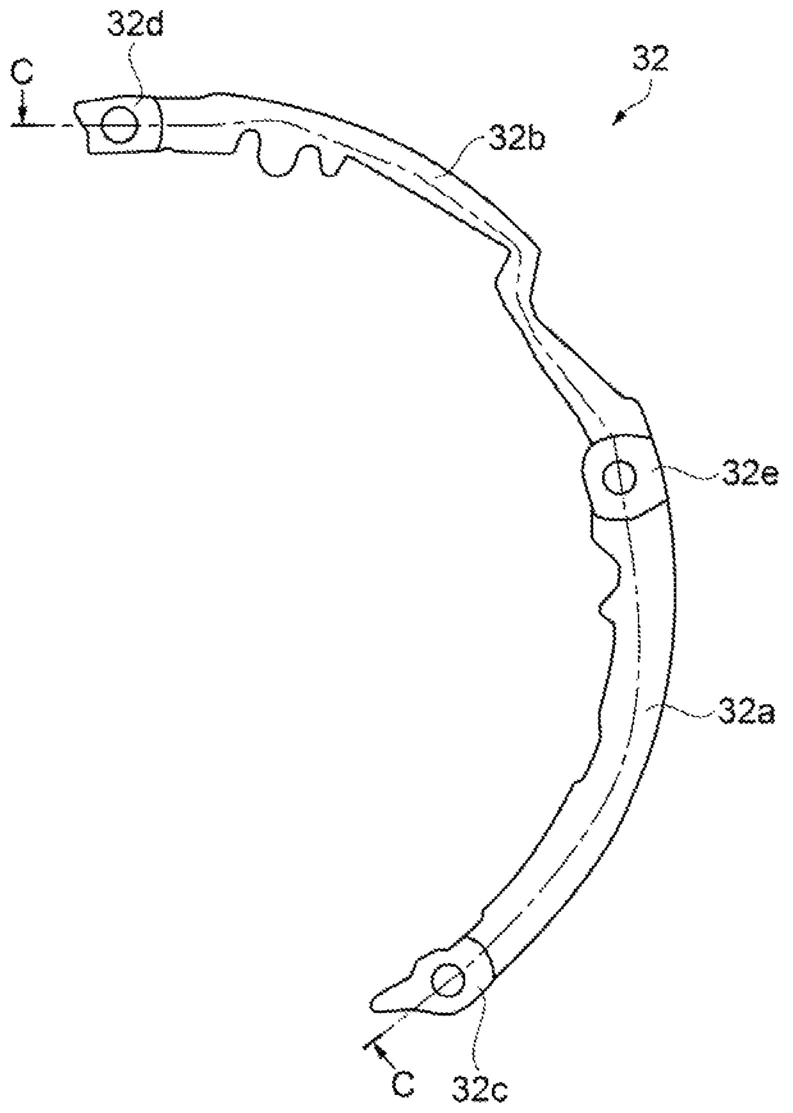
FIG. 9A is a plan view illustrating a configuration of a second magnetic shield component.
Figure 9B:
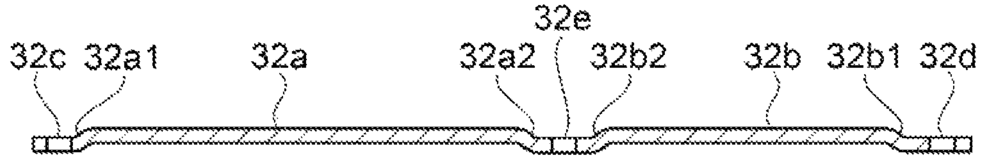
FIG. 9B is a cross-sectional view of the second magnetic shield component taken along line C-C illustrated in FIG. 9A.
Figure 10:
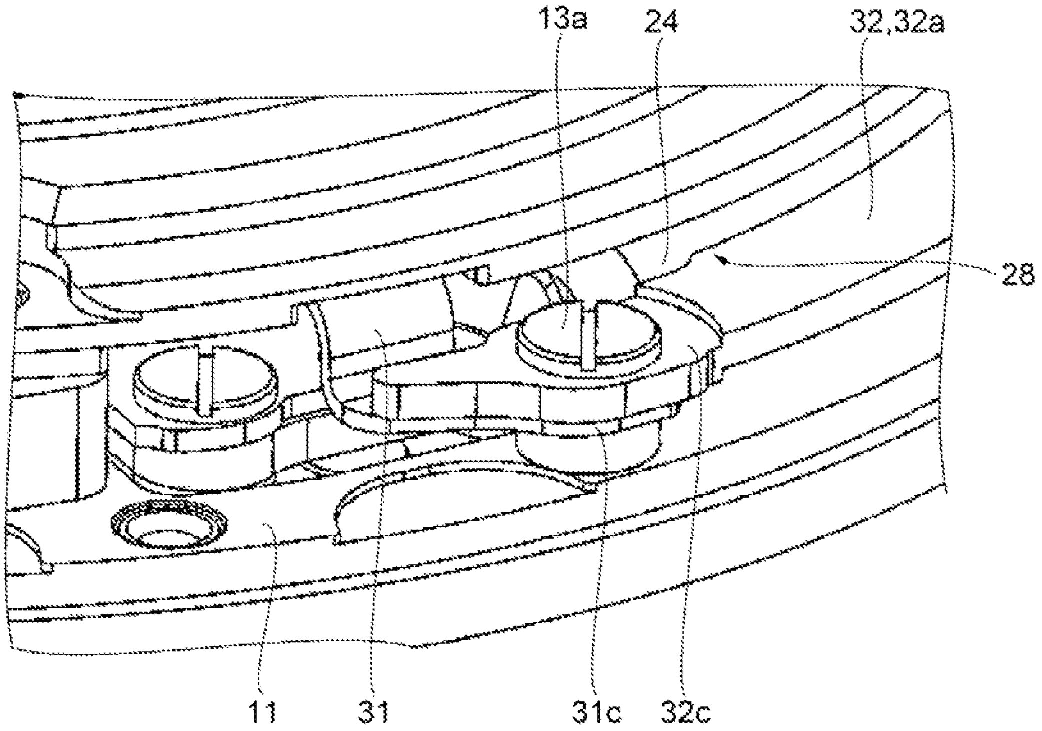
FIG. 10 is a perspective view illustrating in an enlarged manner a portion E of the movement illustrated in FIG. 7.
Figure 11:
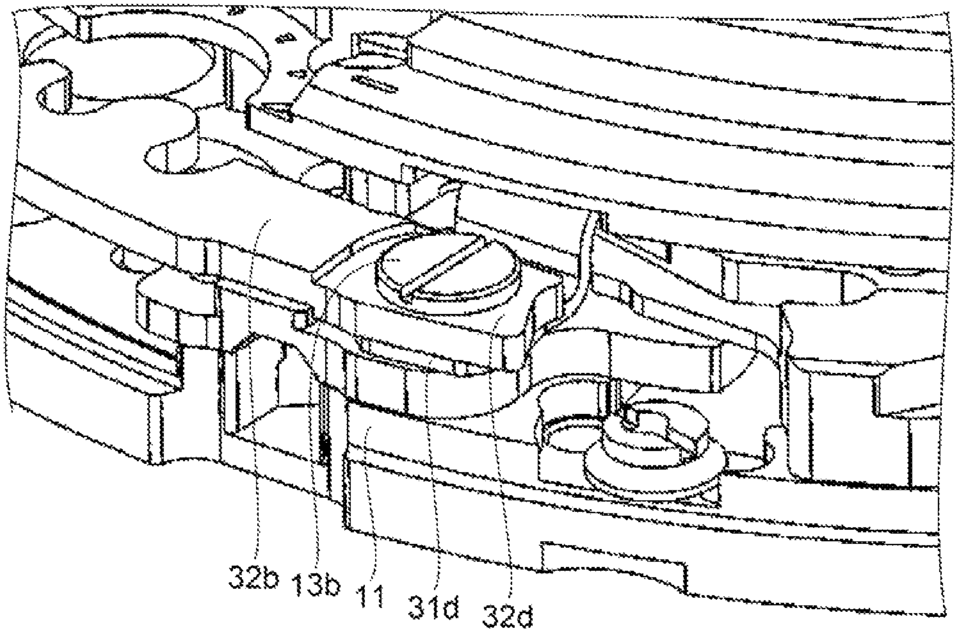
FIG. 11 is a perspective view illustrating in an enlarged manner a portion F of the movement illustrated in FIG. 7.

As illustrated in the FIGS. 9A and 9B, the second magnetic shield component 32 is formed so as to curve and thus surround one half of the first magnetic shield component 31 on the outer peripheral side. The second magnetic shield component 32 includes a first main body portion 32*a*, a second main body portion 32*b*, a first contact portion 32*c*, a second contact portion 32*d*, and a fixing portion 32*e*.

Specifically, the first main body portion 32*a* and the second main body portion 32*b* are disposed at the same height. The first contact portion 32*c* is provided at a position lower than that of the first body portion 32*a* with a step portion 32*a*1 interposed therebetween. The second contact portion 32*d* is provided at a position lower than that of the second main body portion 32*b* with a step portion 32*b*1 interposed therebetween. The fixing portion 32*e* is provided at a position lower than those of the first main body portion 32*a* and the second main body portion 32*b* with the step portions 32*a*2, 32*b*2 interposed therebetween.

That is, the first magnetic shield component 31 includes a step, the step being the step portion 31*a*1 in this exemplary embodiment, in an axial direction of the case 2, that is, the Z direction. The ratchet wheel 29, which is a portion of the train wheel, is disposed in the step formed by the step portion 31*a*1. In this way, a portion of the train wheel is disposed in the step of the first magnetic shield component 31, in other words, the first magnetic shield component 31 is contained within the range of the height of the train wheel, making it possible to dispose the first magnetic shield component 31 in the movement 10 while making the timepiece 1 thinner. Further, by providing the step, it is possible to form the first magnetic shield component 31 into a continuous annular shape without providing a notch for staying clear of the ratchet wheel 29 in the first magnetic shield component 31. Accordingly, as will be described below, it is possible to suppress the influence of a magnetic field from the outside on the stator 24*b*.

As illustrated in FIG. 7, the first magnetic shield component 31 and the second magnetic shield component 32 are in contact with each other in the overlapping region where the first contact portion 31*c* and the first contact portion 32*c* overlap each other in a portion E. The first magnetic shield component 31 and the second magnetic shield component 32 are fixed to, for example, the main plate 11 by a first lockscrew 13*a* (refer to FIG. 10). On the other hand, the first magnetic shield component 31 and the second magnetic shield component 32 are in contact with each other at the second contact portion 31*d* and the second contact portion 32*d* at a portion F. Then, the first magnetic shield component 31 and the second magnetic shield component 32 are fixed to, for example, the main plate 11 by a second lockscrew 13*b* (refer to FIG. 11).

A continuous portion between the first main body portion 31*a* and the side portion 31*a*2 of the first magnetic shield component 31 is covered with the train wheel bridge 25 in plan view as viewed from the case back 9 side, and the contact portions 31*c*, 31*d* are covered with the second magnetic shield component 32 in plan view as viewed from the case back 9 side. Therefore, even if a wrinkle or a crack occurs between the first main body portion 31*a* and the contact portions 31*c*, 31*d* of the first magnetic shield component 31, the wrinkle or the crack that occurred in the first magnetic shield component 31 can be hidden by the train wheel bridge 25 or the second magnetic shield component 32 so as to be hardly visible to the user, suppressing deterioration in appearance quality.

Further, the fixing portion 32*e* of the second magnetic shield component 32 is fixed to the main plate 11 without the first magnetic shield component 31 being interposed therebetween. Note that the first magnetic shield component 31 and the second magnetic shield component 32 are not limited to being in contact with each other at two locations, and may be in contact with each other at three or more locations. Further, the contact is not limited to the contact at the first contact portions 31*c*, 32*c* and the second contact portions 31*d*, 32*d*, and may be at other portions.

With the first magnetic shield component 31 and the second magnetic shield component 32 thus disposed and being in contact with each other, it is possible to form a magnetic conduction path without an air layer interposed between the first magnetic shield component 31 and the second magnetic shield component 32, and enhance a magnetic shield performance. Further, with the first magnetic shield component 31 and the second magnetic shield component 32 incorporated in the movement 10, the timepiece 1 can be made more compact than when the magnetic shield components are disposed between the movement 10 and the case 2.

Further, as illustrated in FIG. 5, the oscillating weight 15 includes a weight 15C and the weight body 15A supporting the weight 15C. In the oscillating weight 15, to facilitate smooth rotation, a thickness L1 of the weight 15C is thicker than a thickness L2 of the weight body 15A. However, by disposing a portion of the weight 15C at a step in alignment with the step of the first magnetic shield portion 31 (that is, the step between the first main body portion 31*a* and the contact portions 31*c*, 31*d*), it is possible to reduce the thickness of the timepiece 1 compared to when the weight 15C is thick in the +Z direction and thus the thickness of the timepiece 1 is increased as in the related art.

Next, an extent of influence that magnetic flux density has on, for example, the stator 24*b* constituting the coil block 24, with the first magnetic shield component 31 being disposed will be described with reference to FIG. 12.

Figure 12:
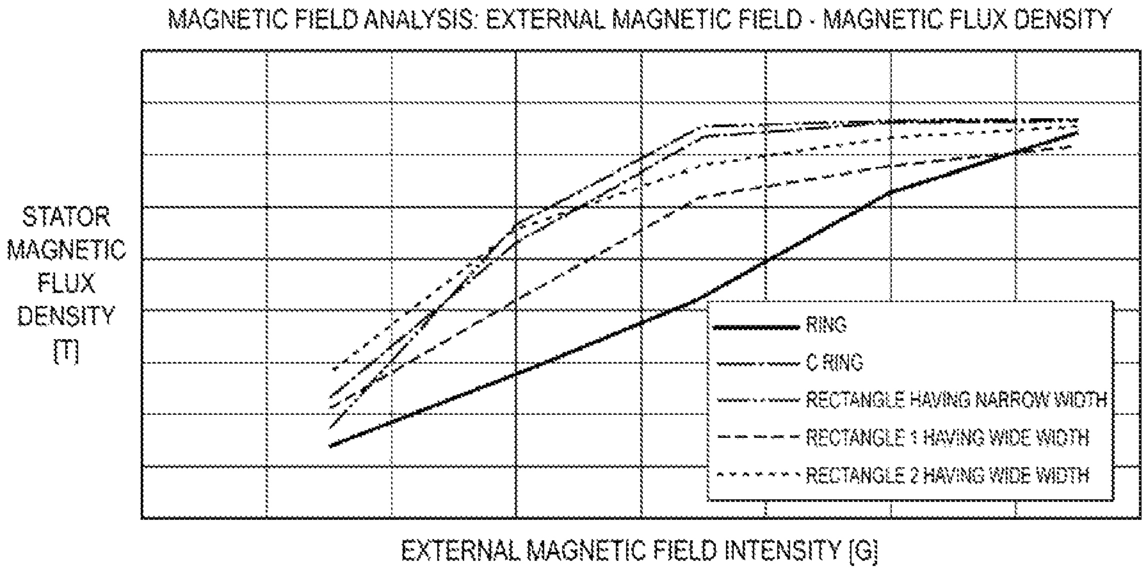
FIG. 12 is a graph showing a relationship between an intensity of an external magnetic field and a magnetic flux density flowing through a stator.

FIG. 12 is a graph showing results of magnetic field analysis obtained by analyzing a relationship between an intensity (G) of a magnetic field received from the outside and a magnetic flux density (T) generated in the stator 24*b* for the first magnetic shield components 31 having different shapes. The horizontal axis represents the intensity (G) of the magnetic field received from the outside, and the magnetic field increases in magnitude rightward. The vertical axis represents the magnetic flux density (T) generated at the stator 24*b*, and the magnetic flux density increases upward.

The magnetic shield components used in the magnetic field analysis had five shapes: a ring shape (that is, annular shape), a C-ring shape in which a portion of the ring is missing, a rectangle having a narrow width, a rectangle 1 having a wide width, and a rectangle 2 having a wide width. Note that as an analysis condition, because the magnetic shield performance depends on the volume of the magnetic shield component, the magnetic shield components were formed into a plate shape having a uniform thickness across the entire shape. Then, all shapes excluding the rectangle 2 having a wide width were given the same volume, and only the rectangle 2 having a wide width was given a volume smaller than that of the other shapes due to the length thereof being shorter than that of the rectangle 1 having a wide width. The magnetic shield components were then each arranged overlapping the stator of the coil block.

As shown in FIG. 12, the most effective shape was the ring shape that had a low magnetic flux density affecting the stator 24*b* even when the intensity of the external magnetic field was high. The shape of the first magnetic shield component 31 was annular as in this exemplary embodiment, making it possible to minimize the influence of the magnetic field from the outside.

As described above, the timepiece 1 according to the exemplary embodiment includes the case 2 having a cylindrical shape, the case back 9 disposed on one side of the case 2 and including the transmissive region, and the movement 10 accommodated in the case 2, the movement 10 including the coil block 24, the first magnetic shield component 31 covering at least a portion on the case back 9 side of the coil block 24, and the second magnetic shield component 32 covering at least a portion of the side surface of the coil block 24. The first magnetic shield component 31 includes the overlapping region overlapping the second magnetic shield component 32 in plan view as viewed from a direction perpendicular to the case back 9, and the first magnetic shield component 31 and the second magnetic shield component 32 are disposed in contact with each other in the overlapping region.

According to this configuration, with the first magnetic shield component 31 and the second magnetic shield component 32 overlapping and being in contact with each other in the overlapping region, it is possible to form a magnetic conduction path without an air layer interposed between the first magnetic shield component 31 and the second magnetic shield component 32. Furthermore, it is possible to hide wrinkles and cracks generated in the first magnetic shield component 31 by the second magnetic shield component 32 disposed on the side surface of the coil block 24, and suppress deterioration in appearance quality.

Further, in the timepiece 1 according to the exemplary embodiment, a plurality of the overlapping regions may be provided. According to this configuration, with the plurality of overlapping regions provided, it is possible to form a plurality of the magnetic conduction paths and improve the magnetic shield performance.

Further, in the timepiece according to the exemplary embodiment, the movement 10 may include the train wheel and the train wheel bridge 25 holding the train wheel, the first magnetic shield component 31 may include the first main body portion 31*a* covering at least a portion on the case back 9 side of the coil block 24, the side portion 31*a*2 extending from the first main body portion 31*a* to the side surface of the coil block 24, and the contact portions 31*c*, 31*d* provided continuously to the side portion 31*a*2 and forming the overlapping region. The continuous portion between the first main body portion 31*a* and the side portion 31*a*2 may be covered with the train wheel bridge 25 in plan view as viewed from the case back 9 side, and the contact portions 31*c*, 31*d* may be covered with the second magnetic shield component 32 in plan view as viewed from the case back 9 side.

According to this configuration, because the train wheel bridge 25 is disposed on the case back 9 side of the first magnetic shield component 31, and the second magnetic shield component 32 is disposed at the side portion 31*a*2 and the contact portions 31*c*, 31*d* of the first magnetic shield component 31, the first magnetic shield component 31 can be hidden so as to be hardly visible from the outside through the transmissive region. That is, the wrinkles and cracks generated when executing processing such as bending on the first magnetic shield component 31 can be hidden, making it possible to suppress deterioration in appearance quality.

Further, in the timepiece 1 according to the exemplary embodiment, the movement 10 may include the oscillating weight including the weight 15C and the weight body 15A supporting the weight 15C, the step may be provided between the first main body portion 31*a* and the contact portions 31*c*, 31*d* in a side view as viewed from a direction parallel to the surface of the case back 9, and a portion of the weight 15C may be disposed at the step. According to this configuration, a portion of the weight 15C is disposed at the step, making it possible to suppress protrusion of the weight 15C to the case back 9 side and reduce the thickness of the timepiece 1 even when, for example, the weight 15C is formed thicker than the weight body to facilitate rotation of the oscillating weight 15.

Further, in the timepiece 1 according to the exemplary embodiment, the timepiece component may be the coil block 24 including the coil 24*a*, the stator 24*b*, and the rotor 40. According to this configuration, the timepiece component is the coil block 24, and the first magnetic shield component 31 and the second magnetic shield component 32 are disposed on the case back 9 side and the side surface of the coil block 24, making it possible to suppress the influence of a magnetic field from the outside on the coil block 24.

Further, in the timepiece 1 according to the exemplary embodiment, the movement 10 may include the mechanical energy source, and the coil block 24 may be the generator 28 configured to convert energy from the mechanical energy source into electric power. According to this configuration, in the timepiece 1 including the mechanical energy source and the generator 28, it is possible to suppress the influence of a magnetic field from the outside on the generator 28.

Further, in the timepiece 1 according to the exemplary embodiment, the first magnetic shield component 31 and the second magnetic shield component 32 may be in contact with each other in the overlapping region by being fixed by the screws 13*a*, 13*b* in the axial direction of the case 2. According to this configuration, it is possible to reliably secure contact between the first magnetic shield component 31 and the second magnetic shield component 32 by fixing the first magnetic shield component 31 and the second magnetic shield component 32 by the screws 13*a*, 13*b*, and form a magnetic conduction path without an air layer interposed therebetween. Further, because the screwing can be performed in the axial direction, the movement 10 can be easily assembled.

Modifications of the exemplary embodiment described above will be described below.

In the exemplary embodiment described above, as the structure in which the magnetic path is formed without an air layer interposed between the first magnetic shield component 31 and the second magnetic shield component 32, a structure in which the first magnetic shield component 31 and the second magnetic shield component 32 are in contact with each other and fixed by the first lockscrew 13*a* and the second lockscrew 13*b* has been described, but the structure is not limited thereto. For example, the structure may be configured as illustrated in FIGS. 13A to 13C.

Figure 13A:
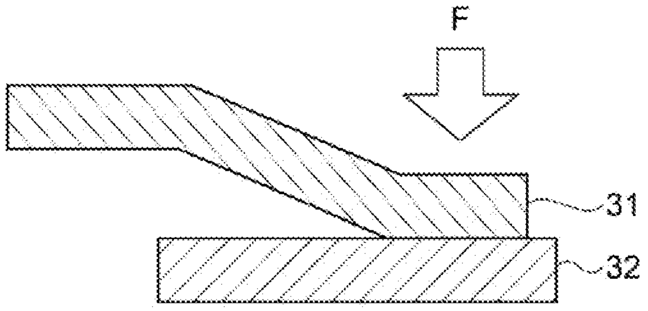
FIG. 13A is a cross-sectional view illustrating a fixing method according to a modification.
Figure 13B:
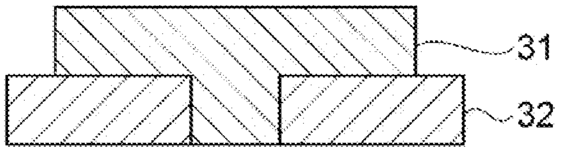
FIG. 13B is a cross-sectional view illustrating a fixing method according to a modification.
Figure 13C:
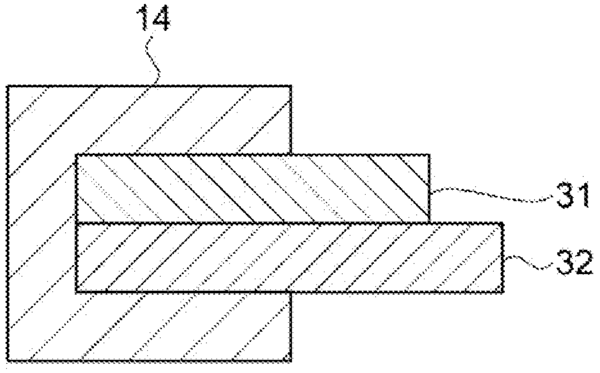
FIG. 13C is a cross-sectional view illustrating a fixing method according to a modification.

FIG. 13A illustrates a structure in which the first magnetic shield component 31 is in contact with the second magnetic shield component 32 by being pressed thereagainst by a spring force. FIG. 13B illustrates a structure in which the first magnetic shield component 31 and the second magnetic shield component 32 are in contact with and fixed to each other, with a protruding portion formed at the first magnetic shield component 31 fitted into a hole formed in the second magnetic shield component 32. Note that the first magnetic shield component 31 and the second magnetic shield component 32 may be arranged in an opposite manner. FIG. 13C illustrates a structure in which the first magnetic shield component 31 and the second magnetic shield component 32 are in contact with and fixed to each other using a clamping component 14. According to these methods, it is possible to form a magnetic conduction path without an air layer interposed between the first magnetic shield component 31 and the second magnetic shield component 32, and enhance the magnetic shield performance.

In the exemplary embodiment described above, the timepiece 1 is described as an electronically controlled mechanical timepiece including the mainspring, the generator 28 driven by the mainspring to generate electrical energy, and the IC that controls the rotation speed of the display train wheel but the embodiment is not limited thereto. For example, the present disclosure may be applied to a mechanical timepiece that does not include the generator 28 but includes a mechanical energy source including the mainspring, the oscillating weight an automatic winding train wheel that winds the mainspring based on the rotation of the oscillating weight 15, and a speed governor such as a balance with a hairspring, or may be applied to a quartz timepiece that includes a battery, a crystal oscillator, and a motor that drives the hands.

According to this configuration, in a mechanical or quartz timepiece, it is possible to achieve both maintenance of the magnetic shield performance and miniaturization of the timepiece.

What is claimed is:

1. A timepiece comprising:

a case having a cylindrical shape;

a case back including a transmissive region and covering one opening of the case; and a movement accommodated in the case, the movement including:

a timepiece component;

a first magnetic shield component covering at least a portion on a case back side of the timepiece component;

a second magnetic shield component covering at least a portion of a side surface of the timepiece component;

a train wheel; and a bridge component holding the train wheel, wherein the first magnetic shield component includes:

an overlapping region overlapping the second magnetic shield component in a plan view as viewed from a direction perpendicular to the case back;

a main body portion covering at least a portion on the case back side of the timepiece component;

a side portion extending from the main body portion to a side surface of the timepiece component; and an overlapping portion provided continuously to the side portion and forming the overlapping region, a continuous portion between the main body portion and the side portion is covered with the bridge component in the plan view, the overlapping portion is covered with the second magnetic shield component in the plan view, and the first magnetic shield component and the second magnetic shield component are disposed in contact with each other in the overlapping region.

2. The timepiece according to claim 1, wherein a plurality of the overlapping regions are provided.

3. The timepiece according to claim 1, wherein the movement includes an oscillating weight, the oscillating weight including a weight and a weight body supporting the weight, a step is provided between the main body portion and the overlapping portion in a side view as viewed from a direction parallel to a surface of the case back, and a portion of the weight is disposed at the step.

4. The timepiece according to claim 1, wherein the timepiece component is a coil block including a coil and a stator.

5. The timepiece according to claim 4, wherein the movement includes a mechanical energy source, and the coil block constitutes a generator configured to convert energy from the mechanical energy source into electric power.

6. The timepiece according to claim 1, wherein the first magnetic shield component and the second magnetic shield component are in contact with each other in the overlapping region by being fixed by a screw in an axial direction of the case.

7. A timepiece comprising:

a case having a cylindrical shape;

a case back including a transmissive region and covering one opening of the case; and a movement accommodated in the case, the movement including:

a timepiece component;

a first magnetic shield component covering at least a portion on a case back side of the timepiece component; and a second magnetic shield component covering at least a portion of a side surface of the timepiece component, wherein the first magnetic shield component includes an overlapping region overlapping the second magnetic shield component along a first direction in a plan view, the first magnetic shield component and the second magnetic shield component are disposed in contact with each other in the overlapping region, the first magnetic shield component has a first step directly adjacent to the overlapping region, and the second magnetic shield component has a second step directly adjacent to the overlapping region.

8. The timepiece according to claim 7, wherein the first step of the first magnetic shield component is located at the overlapping region, and the first step is located lower along the first direction than another part of the first magnetic shield component next to the first step, and the second step of the second magnetic shield component is located directly adjacent to the overlapping region, and the second step is located lower along the first direction than another part of the second magnetic shield component next to the second step.

9. The timepiece according to claim 7, wherein the overlapping region is provided as a plurality of overlapping regions.

10. The timepiece according to claim 7, wherein the movement includes:

a train wheel; and a bridge component holding the train wheel, the first magnetic shield component includes:

a main body portion covering at least a portion on the case back side of the timepiece component;

a side portion extending from the main body portion to a side surface of the timepiece component; and an overlapping portion provided continuously to the side portion and forming the overlapping region, a continuous portion between the main body portion and the side portion is covered with the bridge component in the plan view as viewed from the case back side, and the overlapping portion is covered with the second magnetic shield component in the plan view as viewed from the case back side.

11. The timepiece according to claim 7, wherein the timepiece component is a coil block including a coil and a stator.

12. The timepiece according to claim 11, wherein the movement includes a mechanical energy source, and the coil block constitutes a generator configured to convert energy from the mechanical energy source into electric power.

13. The timepiece according to claim 7, wherein the first magnetic shield component and the second magnetic shield component are in contact with each other in the overlapping region by being fixed by a screw in an axial direction of the case.

* * * * *